United States Patent
Livyatan et al.

(10) Patent No.: US 10,685,424 B2
(45) Date of Patent: *Jun. 16, 2020

(54) DENSE STRUCTURE FROM MOTION

(71) Applicant: MOBILEYE VISION TECHNOLOGIES LTD., Jerusalem (IL)

(72) Inventors: Harel Livyatan, Modiin (IL); Oded Berberian, Jerusalem (IL); Barak Cohen, Modiin (IL); Gideon Stein, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/957,763

(22) Filed: Apr. 19, 2018

(65) Prior Publication Data

US 2018/0315163 A1 Nov. 1, 2018

Related U.S. Application Data

(63) Continuation of application No. 14/182,715, filed on Feb. 18, 2014, now Pat. No. 9,959,595, which is a (Continued)

(51) Int. Cl.
*G06T 3/00* (2006.01)
*G06K 9/62* (2006.01)
(Continued)

(52) U.S. Cl.
CPC ........ *G06T 3/0093* (2013.01); *G06K 9/00798* (2013.01); *G06K 9/6201* (2013.01);
(Continued)

(58) Field of Classification Search
CPC ......... G06T 3/0093; G06T 7/579; G06T 7/20; G06K 9/00798; G06K 9/6201; G06K 9/00805; G06K 9/46; G06G 7/78
See application file for complete search history.

(56) References Cited

U.S. PATENT DOCUMENTS

| 4,383,827 A | 5/1983 | Foerst |
| 5,181,695 A | 1/1993 | Arthur |

(Continued)

FOREIGN PATENT DOCUMENTS

| DE | 102010020688 A1 | 5/2011 |
| EP | 2431917 A1 | 3/2012 |

(Continued)

OTHER PUBLICATIONS

"U.S. Appl. No. 13/237,163, Corrected Notice of Allowability dated Feb. 5, 2016", 2 pgs.
(Continued)

*Primary Examiner* — Dramos Kalapodas
(74) *Attorney, Agent, or Firm* — Schwegman Lundberg & Woessner, P.A.

(57) ABSTRACT

Determining three-dimensional structure in a road environment using a system mountable in a host vehicle including a camera connectable to a processor. Multiple image frames are captured in the field of view of the camera. In the image frames, a line is selected below which the road is imaged. The line separates between upper images essentially excluding images of the road and lower images essentially including images of the road. One or more of the lower images is warped, according to a road homography to produce at least one warped lower image. The three-dimensional structure may be provided from motion of a matching feature within the upper images or from motion of a matching feature within at least one of the lower images and at least one warped lower image.

18 Claims, 12 Drawing Sheets

Related U.S. Application Data continuation-in-part of application No. 13/693,713, filed on Dec. 4, 2012, now Pat. No. 9,118,816, and a continuation-in-part of application No. 13/237,163, filed on Sep. 20, 2011, now Pat. No. 9,280,711.

(60) Provisional application No. 61/727,755, filed on Nov. 19, 2012, provisional application No. 61/727,722, filed on Nov. 18, 2012, provisional application No. 61/567,132, filed on Dec. 6, 2011, provisional application No. 61/385,122, filed on Sep. 21, 2010, provisional application No. 61/766,738, filed on Feb. 20, 2013, provisional application No. 61/767,321, filed on Feb. 21, 2013.

(51) Int. Cl.
  *G06T 7/579* (2017.01)
  *G06K 9/00* (2006.01)
  *G06T 7/20* (2017.01)

(52) U.S. Cl.
  CPC ............... *G06T 7/20* (2013.01); *G06T 7/579* (2017.01); *G06T 2207/10016* (2013.01); *G06T 2207/30256* (2013.01)

(56) References Cited

U.S. PATENT DOCUMENTS

| | | | |
|---|---|---|---|
| 5,259,040 A | | 11/1993 | Hanna |
| 6,192,145 B1* | | 2/2001 | Anandan ................. G06K 9/209 |
| | | | 382/154 |
| 6,704,621 B1 | | 3/2004 | Stein et al. |
| 7,038,577 B2 | | 5/2006 | Pawlicki et al. |
| 7,113,867 B1 | | 9/2006 | Stein |
| 7,151,996 B2 | | 12/2006 | Stein |
| 7,411,486 B2 | | 8/2008 | Gern et al. |
| 7,447,380 B2 | | 11/2008 | Williams et al. |
| 7,489,812 B2 | | 2/2009 | Fox et al. |
| 7,566,851 B2 | | 7/2009 | Stein et al. |
| 7,623,681 B2 | | 11/2009 | Miyahara |
| 7,786,898 B2 | | 8/2010 | Stein et al. |
| 8,064,643 B2 | | 11/2011 | Stein et al. |
| 8,310,355 B2 | | 11/2012 | Chen et al. |
| 8,675,122 B2 | | 3/2014 | Kroepfl et al. |
| 9,118,816 B2 | | 8/2015 | Stein et al. |
| 9,280,711 B2 | | 3/2016 | Stein |
| 9,959,595 B2 | | 5/2018 | Livyatan et al. |
| 2002/0183906 A1 | | 12/2002 | Ikeda |
| 2003/0016287 A1 | | 1/2003 | Nakayama et al. |
| 2006/0197839 A1 | | 9/2006 | Senior et al. |
| 2007/0154068 A1* | | 7/2007 | Stein ......................... G01C 3/22 |
| | | | 382/106 |
| 2008/0137908 A1 | | 6/2008 | Stein et al. |
| 2008/0199045 A1* | | 8/2008 | Ekin .................. G06K 9/00791 |
| | | | 382/104 |
| 2008/0205706 A1* | | 8/2008 | Hongo ..................... B60R 1/00 |
| | | | 382/104 |
| 2008/0288140 A1 | | 11/2008 | Matsuno |
| 2008/0298657 A1 | | 12/2008 | Shiraishi et al. |
| 2008/0310680 A1 | | 12/2008 | Azuma |
| 2009/0010482 A1 | | 1/2009 | Nishida et al. |
| 2009/0010495 A1 | | 1/2009 | Schamp et al. |
| 2009/0169052 A1 | | 7/2009 | Seki et al. |
| 2009/0234543 A1 | | 9/2009 | Groitzsch et al. |
| 2010/0054538 A1 | | 3/2010 | Boon |
| 2010/0057358 A1 | | 3/2010 | Winer et al. |
| 2010/0098297 A1 | | 4/2010 | Zhang |
| 2010/0100321 A1 | | 4/2010 | Koenig et al. |
| 2010/0104199 A1* | | 4/2010 | Zhang ................ G06K 9/00798 |
| | | | 382/199 |
| 2010/0114416 A1 | | 5/2010 | Au et al. |
| 2010/0183192 A1* | | 7/2010 | Fritsch ..................... G06T 7/254 |
| | | | 382/103 |
| 2010/0208034 A1 | | 8/2010 | Chen |
| 2010/0228437 A1 | | 9/2010 | Hanzawa et al. |
| 2010/0315505 A1 | | 12/2010 | Michalke et al. |
| 2011/0063097 A1 | | 3/2011 | Naka et al. |
| 2011/0115912 A1 | | 5/2011 | Kuehnle |
| 2011/0142283 A1* | | 6/2011 | Huang ..................... G06T 7/215 |
| | | | 382/103 |
| 2011/0175998 A1* | | 7/2011 | Azuma ..................... G06T 7/246 |
| | | | 348/135 |
| 2011/0187863 A1 | | 8/2011 | Glander et al. |
| 2011/0254915 A1 | | 10/2011 | Vincent et al. |
| 2011/0255741 A1* | | 10/2011 | Jung ................... G06K 9/00369 |
| | | | 382/103 |
| 2011/0262009 A1 | | 10/2011 | Duan et al. |
| 2012/0033074 A1 | | 2/2012 | Spangenberg |
| 2012/0069185 A1 | | 3/2012 | Stein |
| 2012/0133738 A1 | | 5/2012 | Hoffmeier et al. |
| 2012/0140988 A1 | | 6/2012 | Takahashi |
| 2013/0128049 A1 | | 5/2013 | Schofield et al. |
| 2013/0141580 A1 | | 6/2013 | Stein et al. |
| 2013/0156336 A1 | | 6/2013 | Suk et al. |
| 2013/0177237 A1 | | 7/2013 | Schamp |
| 2014/0112544 A1* | | 4/2014 | Yu .......................... A61B 8/565 |
| | | | 382/107 |
| 2014/0169627 A1 | | 6/2014 | Gupta |
| 2014/0247358 A1 | | 9/2014 | Takeda et al. |
| 2016/0148060 A1 | | 5/2016 | Stein |
| 2017/0177953 A1 | | 6/2017 | Stein |
| 2017/0287108 A9 | | 10/2017 | Livyatan et al. |

FOREIGN PATENT DOCUMENTS

| | | |
|---|---|---|
| EP | 2602741 A2 | 6/2013 |
| JP | 2003233899 A | 8/2003 |
| JP | 2003281552 A | 10/2003 |
| JP | 2007129560 A | 5/2007 |
| JP | 2007309799 A | 11/2007 |
| JP | 2008204304 A | 9/2008 |
| JP | 2010205040 A | 9/2010 |
| WO | WO-2010032523 A1 | 3/2010 |
| WO | WO-2010069167 A1 | 6/2010 |

OTHER PUBLICATIONS

"U.S. Appl. No. 13/237,163, Examiner Interview Summary dated Jul. 7, 2015", 3 pgs.

"U.S. Appl. No. 13/237,163, Final Office Action dated Jan. 12, 2015", 16 pgs.

"U.S. Appl. No. 13/237,163, Final Office Action dated Feb. 27, 2014", 15 pgs.

"U.S. Appl. No. 13/237,163, Non Final Office Action dated Sep. 11, 2014", 15 pgs.

"U.S. Appl. No. 13/237,163, Non Final Office Action dated Oct. 16, 2013", 15 pgs.

"U.S. Appl. No. 13/237,163, Notice of Allowance dated Sep. 30, 2015", 8 pgs.

"U.S. Appl. No. 13/237,163, Response filed Jan. 13, 2014 to Non Final Office Action dated Oct. 16, 2013", 10 pgs.

"U.S. Appl. No. 13/237,163, Response filed May 29, 2014 to Final Office Action dated Feb. 27, 2014", 11 pgs.

"U.S. Appl. No. 13/237,163, Response filed Jul. 13, 2015 to Final Office Action dated Jan. 12, 2015", 11 pgs.

"U.S. Appl. No. 13/237,163, Response filed Dec. 4, 2014 to Non Final Office Action dated Sep. 11, 2014", 12 pgs.

"U.S. Appl. No. 13/693,713, Notice of Allowance dated Feb. 17, 2015", 9 pgs.

"U.S. Appl. No. 13/693,713, Notice of Allowance dated Apr. 23, 2015", 5 pgs.

"U.S. Appl. No. 14/182,715, Advisory Action dated Dec. 14, 2016", 3 pgs.

"U.S. Appl. No. 14/182,715, Examiner Interview Summary dated Sep. 29, 2017", 3 pgs.

"U.S. Appl. No. 14/182,715, Examiner Interview Summary dated Nov. 9, 2016", 4 pgs.

(56) References Cited

OTHER PUBLICATIONS

"U.S. Appl. No. 14/182,715, Final Office Action dated Sep. 15, 2016", 20 pgs.
"U.S. Appl. No. 14/182,715, Non Final Office Action dated Feb. 19, 2016", 18 pgs.
"U.S. Appl. No. 14/182,715, Non Final Office Action dated Apr. 26, 2017", 31 pgs.
"U.S. Appl. No. 14/182,715, Notice of Allowance dated Dec. 28, 2017", 9 pgs.
"U.S. Appl. No. 14/182,715, Response filed Mar. 15, 2017 to Advisory Action dated Dec. 14, 2016", 17 pgs.
"U.S. Appl. No. 14/182,715, Response filed Jul. 11, 2016 to Non Final Office Action dated Feb. 19, 2016", 14 pgs.
"U.S. Appl. No. 14/182,715, Response filed Oct. 25, 2017 to Non Final Office Action dated Apr. 26, 2017", 14 pgs.
"U.S. Appl. No. 14/182,715, Response filed Nov. 29, 2016 to Final Office Action dated Sep. 15, 2016", 11 pgs.
"U.S. Appl. No. 14/182,715, Supplemental Amendment filed Apr. 14, 2017", 3 pgs.
"U.S. Appl. No. 15/012,455, Final Office Action dated Mar. 23, 2017", 7 pgs.
"U.S. Appl. No. 15/012,455, Non Final Office Action dated Mar. 28, 2016", 8 pgs.
"U.S. Appl. No. 15/012,455, Non Final Office Action dated Nov. 1, 2017", 10 pgs.
"U.S. Appl. No. 15/451,146, Non Final Office Action dated Dec. 15, 2017", 10 pgs.
"European Application Serial No. 11182201.1, Communication Pursuant to Article 94(3) EPC dated Oct. 13, 2016", 4 pgs.
"European Application Serial No. 11182201.1, Communication Pursuant to Article 94(3) EPC dated Dec. 16, 2015", 4 pgs.
"European Application Serial No. 11182201.1, Extended European Search Report dated Feb. 3, 2012", 6 pgs.
"European Application Serial No. 11182201.1, Response filed Sep. 21, 2012 to Extended European Search Report dated Feb. 3, 2012", 17 pgs.
"European Application Serial No. 17203013.2, Extended European Search Report dated Jan. 10, 2018", 3 pgs.
Arrospide, Jon, et al., "Homography-based ground plane detection using a single on-board camera", Intelligent Transport Systems, IET 4.2, (2010), 149-160.
Avidan, et al., "Trajectory Triangulation: 3D Reconstruction of Moving Points from a Monocular Image Sequence", IEEE Transactions on Pattern Analysis and Machine Intelligence, vol. 22, No. 4, (Apr. 2000), 348-357.
Braillon, Christophe, et al., "Real-time moving obstacle detection using optical flow models", Intelligent Vehicles Symposium, 2006 IEEE. IEEE, (2006), 7 pgs.
Brox, Thomas, et al., "High Accuracy Optical Flow Estimation Based on a Theory for Warping", In Proceedings of 8th European Conference on Computer Vision, Springer LNCS 3024, T. Pajdla and J. Matas (Eds.), val. 4, (May, 2004), 13 pgs.
Conrad, Daniel, "Homography-based ground plane detection for mobile robot navigation using a modified em algorithm", Robotics and Automation (ICRA), 2010 IEEE International Conference on IEEE, (2010).
Handmann, Uwe, et al., "An image processing system for driver assistance", IEEE International Conference on Intelligent Vehicles,, (1998), 6 pgs.
Harpreet, S Sawhney, "Simplifying motion and structure analysis using planar parallax and image warping", International Conference on Pattern Recognition, (1994), 403-408.
Horn, et al., "Determining Optical Flow", Massachusetts Institute of Technology Artificial Intelligence Laboratory, (Apr. 1980), 185-203.
Horn, Berthold K, et al., "Determining optical flow", Artificial Intelligence, (1981), 19 pgs.
Jain, Ramesh, et al., "Depth", Machine vision, vol. 5. New York: McGraw-Hill, Chapter 11, (1995), 289-308.

Kaewtrakulpong, et al., "An Improved Adaptive Background Mixture Model for Real-time Tracking with Shadow Detection", Video-based surveillance systems, Springer US, (Sep. 2001), 5 pgs.
Klappenstein, Jens, "Applying Kalman filtering to road homography estimation", Proc. Workshop Planning Perception Navigation Intelligent Vehicles (in conjunction with IEEE Int. Conf. Robotics Automation), (2007), 6 pgs.
Liu, C, "Beyond pixels: exploring new representations and applications for motion analysis", Doctoral Thesis. Massachusetts Institute of Technology, (May 2009), 164 pgs.
Lourakis, et al., "Chaining planar homographies for fast and reliable 3d plane tracking", Pattern Recognition, 2006. ICPR 2006. 18th International Conference on. vol. 1. IEEE, (2006), 5 pgs.
Mori, Hideo, et al., "Shadow and rhythm as sign patterns of obstacle detection", Industrial Electronics, 1993. Conference Proceedings, ISIE'93—Budapest., IEEE International Symposium on. IEEE, (1993), 7 pgs.
Nadimi, et al., "Physical models for moving shadow and object detection in video", Pattern Analysis and Machine Intelligence, IEEE Transaction, (2004), 1079-1087.
Prati, Andrea, et al., "Shadow detection algorithms for traffic flow analysis: a comparative study", Intelligent Transportation Systems, 2001, IEEE, (2001), 6 pgs.
R, Wallace, et al., "Progress in robot road-following", IEEE, (1986), 1615-1621.
Rabe, et al., "Kalman Filter based Detection of Obstacles and Lane Boundary in Monocular Image Sequences", Autonome Mobile Systeme 2005. Springer Berlin Heidelberg, (2006), 7 pgs.
Rattei, Florian, et al., "Shadow-based vehicle model refinement and tracking in advanced automotive driver assistance systems", Embedded Systems for Real-Time Multimedia (ESTIMedia), 2011 9th IEEE Symposium on. IEEE, (2011), 10 pgs.
Stein, Gideon P, et al., "A Robust Method for Computing Vehicle Ego-motion", Proceedings of IEEE Intelligent Vehicles Symposium, (Oct. 3-5, 2000), 362-368.
Yu-Lun, Chen, "Disparity and Depth Map Computation", Masters Thesis, Department of Computing Science National Chengchi University, Chapter 3, (Apr. 2006), 27-37.
Zhang, Chenxi, "Semantic segmentation of urban scenes using dense depth maps", Computer Vision-ECCV, Springer Berlin Heidelberg, (2010), 708-721.
"European Application Serial No. 12195922.5, Communication Pursuant to Article 94(3) EPC Sep. 5, 2016", 6 pgs.
"European Application Serial No. 12195922.5, Communication Pursuant to Article 94(3) EPC Nov. 7, 2017", 6 pgs.
"European Application Serial No. 12195922.5, Extended European Search Report dated Nov. 21, 2014", 10 pgs.
"European Application Serial No. 12195922.5, Response filed May 11, 2018 to Communication Pursuant to Article 94(3) EPC Nov. 7, 2017", 11 pgs.
"European Application Serial No. 12195922.5, Response filed May 25, 2017 to Communication Pursuant to Article 94(3) EPC Sep. 5, 2016", 13 pgs.
"European Application Serial No. 12195922.5, Response filed Jun. 19, 2015 to Extended European Search Report dated Nov. 21, 2014", 19 pgs.
"Japanese Application Serial No. 2017-175381, Notification of Reasons for Refusal dated Nov. 27, 2018", W/ English Translation, 8 pgs.
Kruger, W, "Robust real-time ground plane motion compensation from a moving vehicle", Machine Vision and Applications. Springer Verlag. DE. vol. 11. No. 4, (Jan. 1, 1999), 203-212.
Sull, S, et al., "Model-based obstacle detection from image sequences", Proceedings of the International Conference on Image Processing. (ICIP). Washington, Oct. 23-26, 1995; val. 2, (Oct. 23, 1995), 647-650.
U.S. Appl. No. 13/237,163 U.S. Pat. No. 9,280,711, filed Sep. 20, 2011, Barrier and Guardrail Detection Using a Single Camera.
U.S. Appl. No. 13/693,713 U.S. Pat. No. 9,118,816, filed Dec. 4, 2012, Road Vertical Contour Detection.
U.S. Appl. No. 14/182,715 U.S. Pat. No. 9,959,595, filed Feb. 18, 2014, Dense Structure from Motion.

(56) References Cited

OTHER PUBLICATIONS

"European Application Serial No. 12195922.5, Response filed Oct. 10, 2019 to Summons to Attend Oral Proceedings dated Feb. 28, 2019", 12 pgs.

"European Application Serial No. 12195922.5, Summons to Attend Oral Proceedings dated Feb. 28, 2019", 8 pgs.

"Indian Application Serial No. 3441/MUM/2012, First Examination Report dated Dec. 20, 2018", 6 pgs.

"Indian Application Serial No. 3441/MUM/2012, Response filed Jun. 19, 2019 to First Examination Report dated Dec. 20, 2018", 15 pgs.

"Japanese Application Serial No. 2017-175381, Response filed Apr. 25, 2019 to Notification of Reasons for Refusal dated Nov. 27, 2018", w/ English claims, 11 pgs.

"European Application Serial No. 12195922.5, Decision to Refuse dated Dec. 6, 2019", 10 pgs.

\* cited by examiner

50a

50b

DENSE STRUCTURE FROM MOTION

CROSS REFERENCE TO RELATED APPLICATIONS

This application is a continuation of U.S. patent application Ser. No. 14/182,715, filed Feb. 18, 2014, now U.S. Pat. No. 9,959,595, issued May 1, 2018, which is a continuation-in-part application of U.S. patent application Ser. No. 13/693,713, filed Dec. 4, 2012, now U.S. Pat. No. 9,118,816, issued Aug. 25, 2015, which claims the benefit of U.S. Provisional Application No. 61/727,755, filed Nov. 19, 2012, U.S. Provisional Application No. 61/727,722, filed Nov. 18, 2012, and U.S. Provisional Application No. 61/567,132, filed Dec. 6, 2011. This application is also a continuation-in-part application of U.S. patent application Ser. No. 13/237,163, filed Sep. 20, 2011, now U.S. Pat. No. 9,280,711, issued Mar. 8, 2016, which claims the benefit of U.S. Provisional Application No. 61/385,122, filed Sep. 21, 2010. This application also claims the benefit of U.S. Provisional Application No. 61/767,321, filed Feb. 21, 2013, and U.S. Provisional Application No. 61/766,738, filed Feb. 20, 2013. The disclosures of each of the foregoing are hereby incorporated by reference in their entireties.

BACKGROUND

1. Technical Field

The present disclosure relates to computing accurate dense structure from motion in the automotive environment.

2. Description of Related Art

Structure-from-Motion (SfM) refers to methods for recovering three-dimensional information of a scene that has been projected onto the focal plane of a camera. The structural information derived from a SfM algorithm may take the form of a set of projection matrices, one projection matrix per image frame, representing the relationship between a specific two-dimensional point in the image plane and its corresponding three-dimensional point. SfM algorithms rely on tracking specific image features from image frame to image frame to determine structural information concerning the scene.

Similarly, stereo or multi-ocular disparity analysis may be used to determine three-dimensional points from two-dimensional images. Finding structure from motion presents a similar problem as finding structure from stereo vision. In both instances, the correspondence between images and the reconstruction of three-dimensional object is found.

Monocular camera driver assistance systems (DAS) are becoming more and more common. These systems provide lane departure warning (LDW), forward collision warning (FCW) and traffic sign recognition (TSR) among other features. Since the hardware cost for such systems is significant there is interest in enhancing current functions with new features and adding new functions on the same hardware platform.

BRIEF SUMMARY

Various methods and systems are disclosed herein for determining three-dimensional structure in a road environment. The systems are mountable in a host vehicle and include a camera connectable to a processor. Multiple image frames are captured in the field of view of the camera. In the image frames, a line is selected below which the road is imaged. The line separates between upper images essentially excluding images of the road and lower images essentially including images of the road. One or more of the lower images is warped, according to a road homography to produce at least one warped lower image. One or more of the image frames may be warped according to ego-motion of the host vehicle. The three-dimensional structure may be provided from motion of a matching feature within the upper images or from motion of a matching feature within at least one of the lower images and at least one warped lower image. An image feature may first be matched between the lower images which are unwarped to produce a first matching result. The feature may be matched between at least one of the unwarped lower images and a warped lower image to produce a second matching result. An image disparity may be selected for the feature which corresponds to the first matching result or the second matching result. From a disparity map of the warped lower image, it may be determined which image points are of the road. An image disparity may be selected for the image points of the road from matching features of at least one warped lower image.

An image portion in the image frames may be pre-warped to correspond to a vertical plane perpendicular to the direction of travel at a distance Z from the vehicle. The distance Z is selectably either a fixed value or dependent on vehicle motion.

An image portion in the image frames may be pre-warped to correspond to two vertical planes parallel to the direction of travel at a fixed (real space) distance to the left and right of the camera.

Three or more image frames may be captured in the field of view of the camera of the road environment: a first image frame at time A, a second image frame at time B and a third image frame at time C. The time interval (C-A) is significantly greater than the time interval (B-A). An epipole is a stationary point on image transformation between the image frames. For an image feature near the epipole, image motion is computed between the third image frame captured at time C and the first image frame captured at time A. For an image feature far from the epipole, image motion is computed from the second image frame captured at time B and the first image frame captured a time A. Upon failure to track features near the epipole using image frames between the first and third image frames, feature tracking may be performed again using the first and second image frames.

The image frames for computing the image motion may be selected according to distance traveled (e.g. measured from a signal of the speedometer of the vehicle). A frame buffer may store image frames for selected distances traveled and/or at a given time interval between the image frames or a combination therefrom. When using multiple image pairs, tracked features between images of relatively close objects may be used as an initial guess to initialize search for images of a farther three dimensional object.

Image resolution of the image frames may be reduced by performing a local histogram equalization around a matching feature within the image frames and the three-dimensional structure may be provided from motion of the matching feature within the image frames of reduced resolution. A rank transform may be performed on the image frames prior to computing motion disparity between the image frames to provide the three-dimensional structure from the motion of the matching features. The rank transform replaces a gray-scale of a picture element with a count of pixels in a local neighborhood of the picture element which have a lower gray-scale value than the picture element.

BRIEF DESCRIPTION OF THE DRAWINGS

The invention is herein described, by way of example only, with reference to the accompanying drawings, wherein.

DETAILED DESCRIPTION

Figure 1:
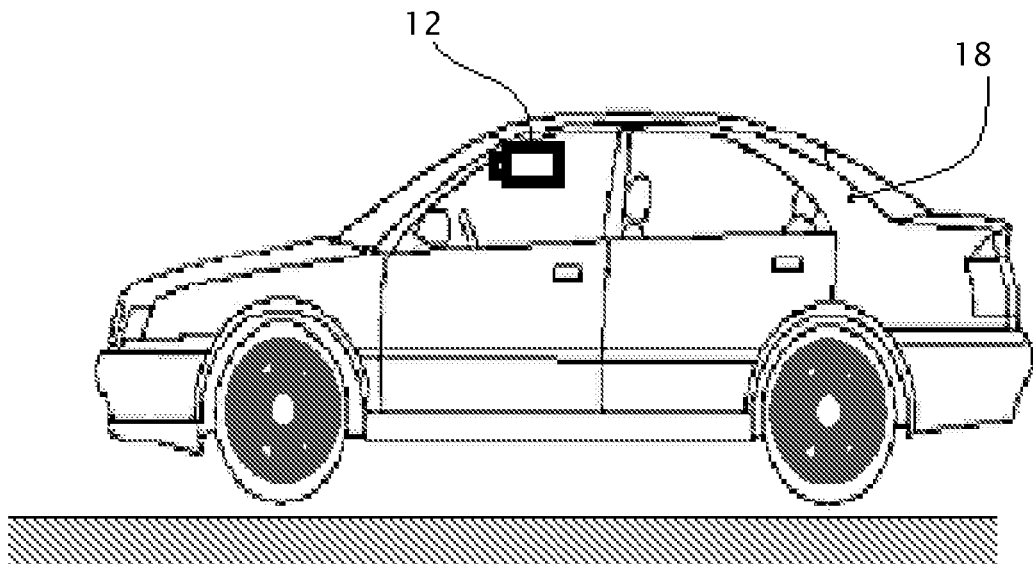
FIGS. 1 and 2 illustrate a system including a camera mountable in a vehicle, according to an aspect of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, embodiments of the present invention may be directed to images from a camera moving through space which may provide rich information about the three-dimensional structure through which the camera is moving. Structure from motion (SfM) can provide a base for a set of new functions such as lane keeping in construction areas and obstacle avoidance from general objects. However, the automotive domain is a very challenging real world environment. A driver assistance system or vehicle control system must have availability in a variety of lighting and weather conditions. The exact details of the environment is unknown in advance markers may not be added in advance. Such a system ideally performs accurately whenever possible, is fail-safe and is aware of changes in the road environment and when detection and/or guidance algorithms have failed. The automotive environment does have however, some properties and constraints that may be exploited in order to simplify driver assistance and/or vehicle control.

Thus there is a need for and it would be advantageous to have driver assistance and/or vehicle control systems and corresponding methods adapted to provide accurate dense structure from motion (SfM) which provides a base for new functionality including lane keeping and obstacle avoidance from general objects for a variety of lighting and weather conditions.

Figure 2:
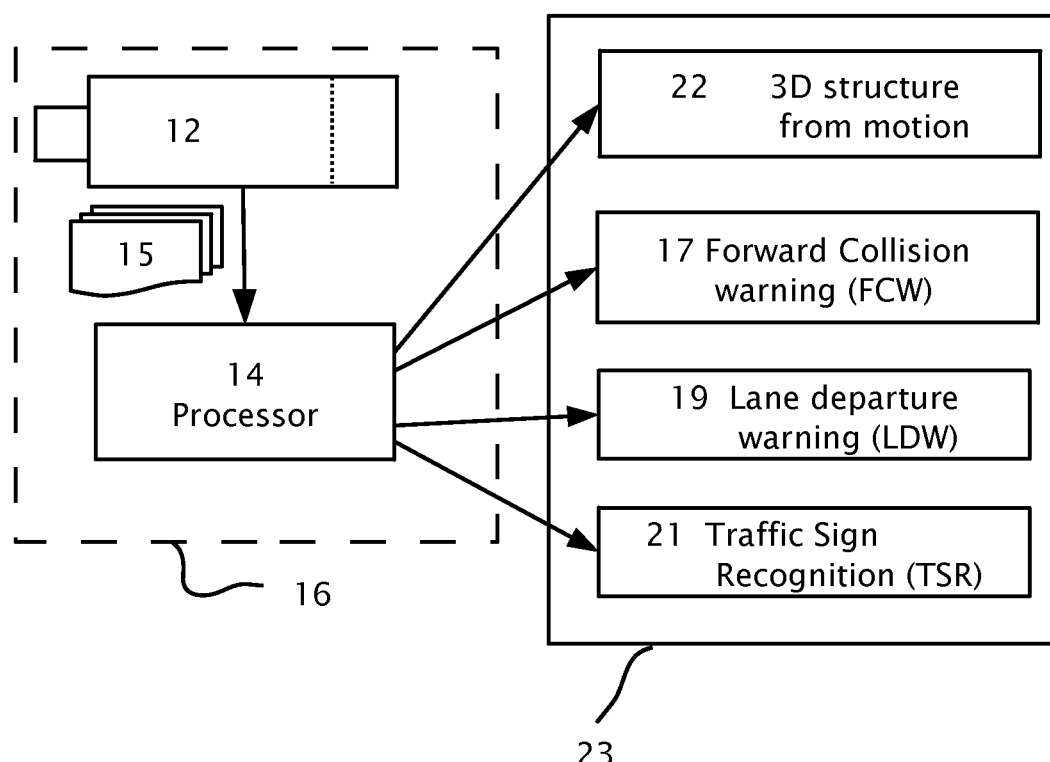

Referring now to the drawings, reference is now made to FIGS. 1 and 2 which illustrate a system 16 including a camera or image sensor 12 mountable in a vehicle 18, according to an aspect of the present invention. Image sensor 12, imaging a field of view in the forward direction typically delivers images in real time and the images may be captured in a time series of image frames 15. An image processor 14 may be used to process image frames 15 simultaneously and/or in parallel to serve a number of driver assistance and/or vehicle control systems. Image sensor 12 may be monochrome or black-white, i.e. without color separation or a color, e.g. RGB sensor. By way of example in FIG. 2, image frames 15 may be used to serve a warning system stored in system memory 23 which may include collision warning 17, lane departure warning 19, traffic sign recognition (TSR) 21 and three dimensional structure determination 22 from motion, according to an embodiment of the present invention. Image processor 14 is used to process image frames 15 to determine and optionally detect three-dimensional structure in view of camera 12. The terms "camera" and "image sensor" are used herein interchangeably. The determination and/or detection 22 of three-dimensional structure is important for many driver assistance functions. Aspects of the present invention may include exchange of information between three-dimensional structure determination 22 and other driver assistance functions and/or systems including but not limited by FCW 17 and LDW 19. For example, a Lane Departure Warning (LDW) 19 as part of system memory 23, may respond more strongly to a lane departure towards a 3D structure such as guard rail or a barrier rather than a lane marker or even a white line. A Forward Collision Warning (FCW) system 19 may trigger sooner if the path to either side of in-path vehicle is blocked by a guard rail or another vehicle.

The term "object" as used herein refers to an object in real space being viewed by a camera. A guard rail along the edge of a road and a lane marker in the road are examples of objects. The term "image" refers to the image of one or more objects in image space at the focal plane of camera 12. Image coordinates (x,y) in small letters refer to image space and may be in arbitrary units or numbers of picture elements in the horizontal and vertical directions with the pixel dimensions assumed. The term "image motion" refers to motion of an image of an object in image space. From image frame 15 to another image frame 15 the points of the image of the object may map from one set of coordinates (x1,y1) to a different set of coordinates (x2,y2). The term "image motion" refers to the mapping of coordinates of an image from image frame to image frame or a function of the mapping. The term "image flow" or "flow" as used herein interchangeably refers to image motion of an image feature. Camera motion causes image flow to be outward from an epipole from an image frame to a prior image frame which was captured earlier. The term "focus of expansion" (FOE) is a point in the imate flow from which all image motion seems to emanate. The term "epipole" and "focus of expansion" (FOE) are used herein interchangeably. The term "projection" or "projecting" as used herein refers to camera or perspective projection for three-dimensional real-space to two-dimensional image space unless otherwise indicated by the context. The term "homography" as used herein refers to a transform or operator from a two-dimensional surface in real-space such as a road surface to the two-dimensional image plane.

The term "conjugate pair" as used herein refers to two points in different images that are the projections of the same point in the scene.

The term "disparity" as used herein refers to the distance between points of a conjugate pair if the two images are matched and superimposed.

Figure 3A:
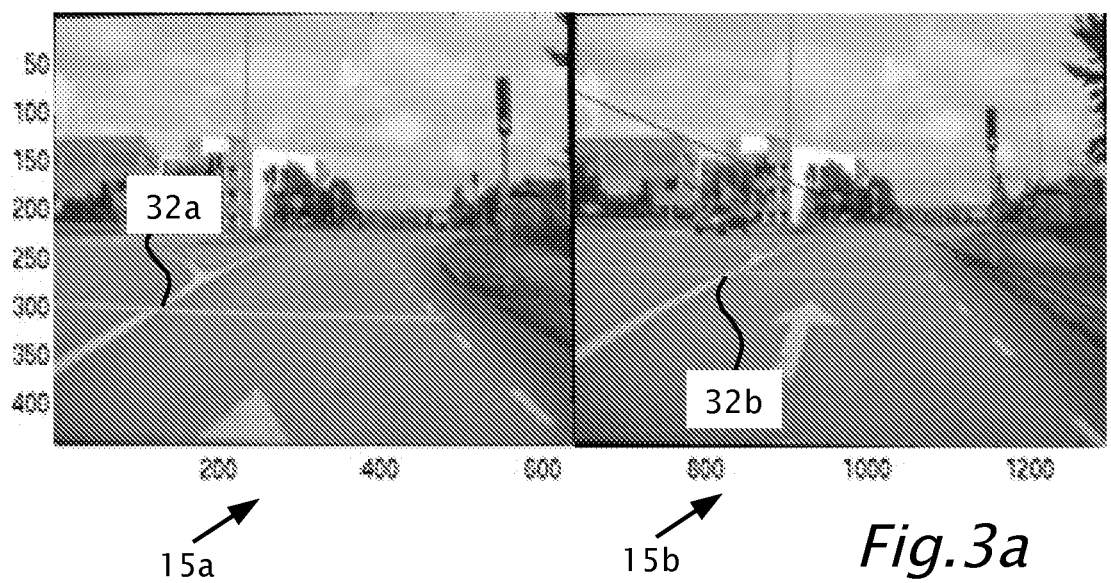
FIG. 3a shows two image frames of a road scene captured from a camera mounted in a moving vehicle, according to a feature of the present invention.

Reference is made to FIG. 3a shows two image frames 15a, 15b of a road scene captured from a camera mounted in a moving vehicle, according to a feature of the present invention. Two captured image frames 15a,15b show a pair of matching feature points 32a and 32b by way of example. Features which may include points, lines, curves, closed or open shapes may be detected in the current image frame 15a shown on the left and matched to an earlier image frame 15b shown on the right. Due to forward motion of the host vehicle 18, the image flow is outwards from current image frame 15a to earlier image frame 15b. Feature points 32 may be detected, for example using a Harris Corner detector. Feature points 32 may have strong intensity gradients in both x and y directions. Matching may be performed by the algorithm of Lukas-Kanade or using exhaustive search for the best match in a small region around feature point 32.

With exhaustive search, matching functions of SSD (sum square distance), SAD (sum absolute distance) or normalized correlation may be used between two images and the set of matching feature points 32. Correspondence between image frames 15 may be found by taking a small patch from one image around a point and finding the closest match to that patch in the second image. The patch may be 7×7 pixels. SAD and SSD are fast to compute but are sensitive to brightness changes. Normalized correlation is more robust but expensive to compute.

Host vehicle 18 speed may be known independently or from image frames 15 and image frames 15 may be selected so that there is at least a minimal amount (e.g. 1 meter) of forward motion.

Figure 3B:
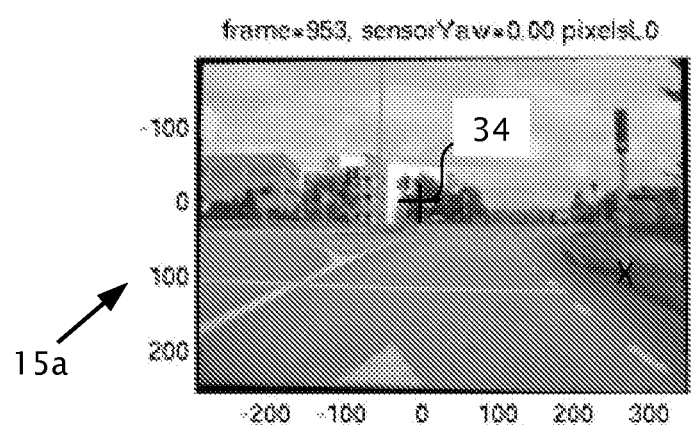
FIGS. 3b and 3c show the same two image frames as in FIG. 3a with the recovered epipole marked by a cross, according to a feature of the present invention.
Figure 3C:
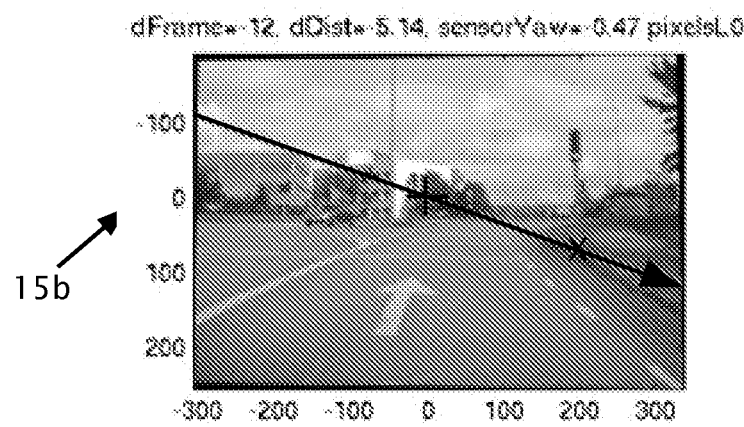

Reference is now made to FIGS. 3b and 3c which show two images 15a, 15b and the recovered epipole marked by cross 34, according to a feature of the present invention. The image flow flows outward from image frame 15b to image frame 15a as shown by the arrow of line 36 in image 15b from the epipole point indicated by cross 34. The corresponding point to the base of the lamppost in image 15a (marked with an X) lies along line 36 passing from the epipole along line 36 in image 15b. All corresponding points on stationary objects lie similarly on epipolar lines.

In addition to feature point tracking, an estimation of the ego motion may be performed. Since the internal camera 12 parameters (focal length and principal point) are known or estimated, the rotation matrix R and translation vector T may be estimated directly rather than using projective methods for uncalibrated cameras. Using an initial guess for rotation matrix R and translation vector T using inertial sensors, steering angle and host vehicle 18 speed sensors, the ego motion parameters, corrections to rotation matrix R and translation vector T may be iteratively found that minimize the image distance of matching feature points 32 to the epipolar lines. In order to make system 16 more robust to outliers, the median distance over all the points may be used (rather than mean distance). Translation vector T is known only up to a scale factor. The magnitude of translation vector T may be taken from the host vehicle 18 speed and time difference between image frames 15. Once rotation matrix R and translation vector T are known, the two images may be rectified to remove the rotation maintaining the epipole as a stationary point between image frames 15.

Figure 3D:
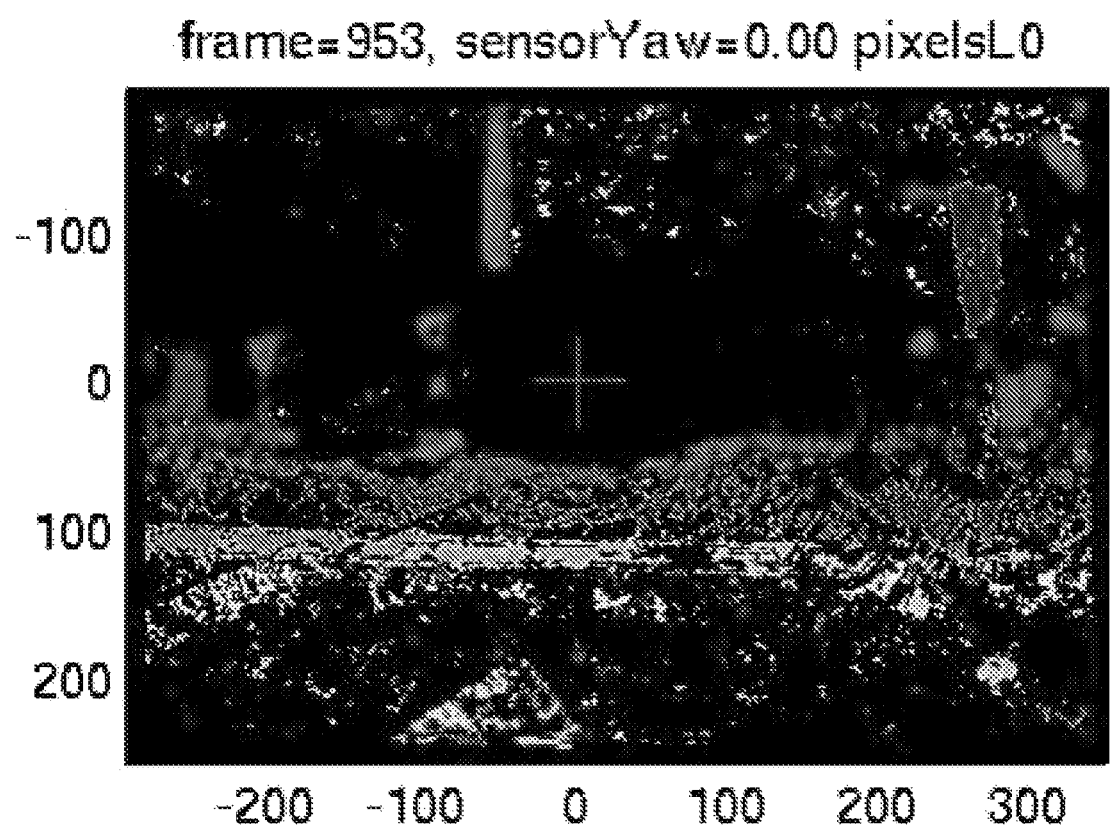
FIG. 3d shows a disparity map that results from an algorithm of one of the image frames of FIG. 3a, according to a feature of the present invention.

FIG. 3d shows a disparity map that results from a simple algorithm with the SAD matching function, according to a feature of the present invention. Large objects show up clearly but there are many 'holes', in particular on the road surface and there is not much detail in far distance. These are among the issues that require an improved method, according to embodiments of the present invention.

Using Multiple Pairs

A possible problem with computing depth to distant points is that the image motion is often very small. In order for the image flow to be substantial enough to give accurate depth, camera 12 motion motion must be large enough relative to the depth. Furthermore, given that the motion close the epipole is small, in order to get useful information near the epipole, camera 12 motion must be large. However, large camera 12 motion will give very large image motion on close targets and especially when they are far from the epipole. Large image motions are are difficult to track because the image has changed significantly and it is also computationally expensive to track over large motions.

Thus, no single image motion is suitable for all depths and all parts of an image. The solution is to use multiple image pairs.

Figure 4A:
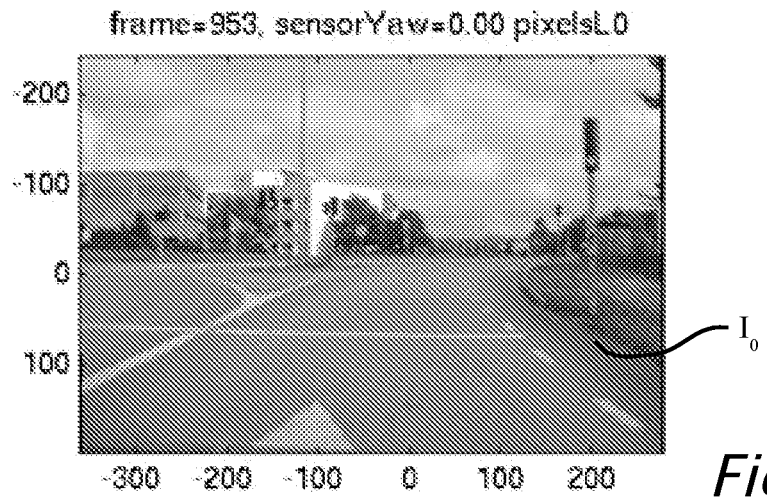
FIGS. 4a, 4b and 4c show three image frames respectfully from the same road scene of FIG. 3a, a current image frame, an image frame captured two frames earlier than the current frame and an image frame captured twelve frames earlier than the current frame, according to an embodiment of the present invention.
Figure 4B:
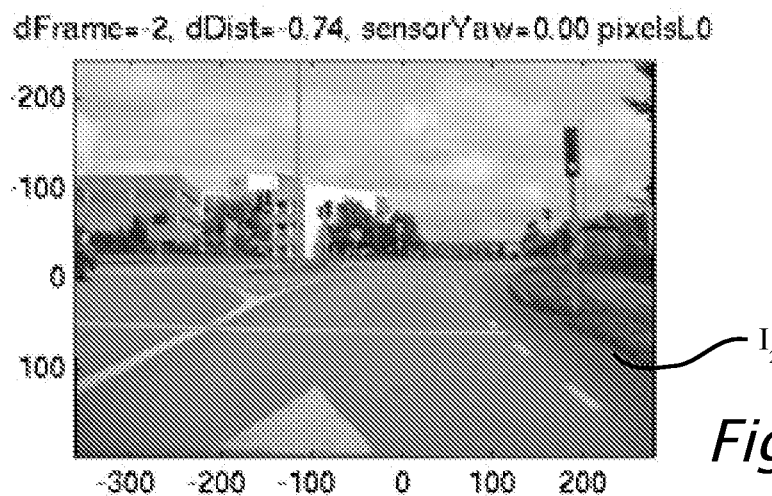
Figure 4C:
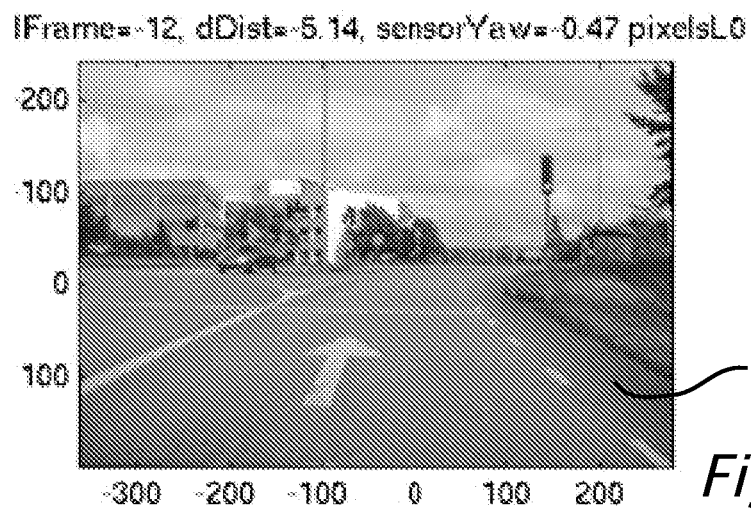

Reference is now made to FIGS. 4a, 4b and 4c which show the current image ($I_0$), the image 2 frame before ($I_{-2}$) and the image 12 frames before ($I_{-12}$) respectively, according to an embodiment of the present invention. System 16 computes the disparity map for image pair ($I_0$, $I_{-2}$) and for image pair ($I_0$, $I_{-12}$) and takes the larger disparity if the larger disparity is valid otherwise system 16 uses the smaller disparity.

Alternatively, disparity values can be taken from the image pair ($I_0$, $I_{12}$) close to the focus of expansion (FOE) and from image pair ($I_0$, $I_2$) far from the FOE. In order to save processing time, the FOE can be estimated using inertial sensors and prior motion, and the disparities are computed between frames ($I_0$, $I_{12}$) close to the FOE and from image pair ($I_0$, $I_2$) far from the FOE. If processing time is then available, the disparity maps can be further tuned based on the results. Upon tracking failure for features close to the FOE using frames ($I_0$, $I_{12}$), tracking can be performed again using images ($I_0$,$I_{12}$) or any other close image pair. Of the lower priority, if the disparity is very small for points far from the FOE, tracking can be performed again using frames ($I_0$,$I_{12}$). This is of lower priority since being far from the FOE and with small disparity implies that such points are typically far away and off the vehicle path.

The concept can be extended further and a fourth image can be used where the motion is even larger in order to detect structure accurately on objects even farther away. An additional image can be selected between $I_2$ and $I_{12}$ so as to allow finer selection ranges. For example one might use images $I_0$, $I_2$, $I_5$ and $I_{12}$.

The images can also be chosen according to distance traveled (e.g. measured from the speedometer signal). Images can be chosen when the car was at least 0.5 m, 1.5 m and 5 m behind. Or a combination can be chosen where one prior image is two frames prior and a second prior image was at least a certain distance prior. A frame buffer can be maintained where frames are stored for certain distance traveled rather than at certain time spacing. This allows for a finite sized buffer to cover significant motion even when the vehicle is traveling slowly.

When using multiple image pairs, tracked features between close images can be used as an initial guess to initialize the exhaustive search in a more far away image pair. For example, the search in image $I_{12}$ can be initialized at 6 times the motion detected between frames $I_0$ and $I_2$.

Figure 4D:
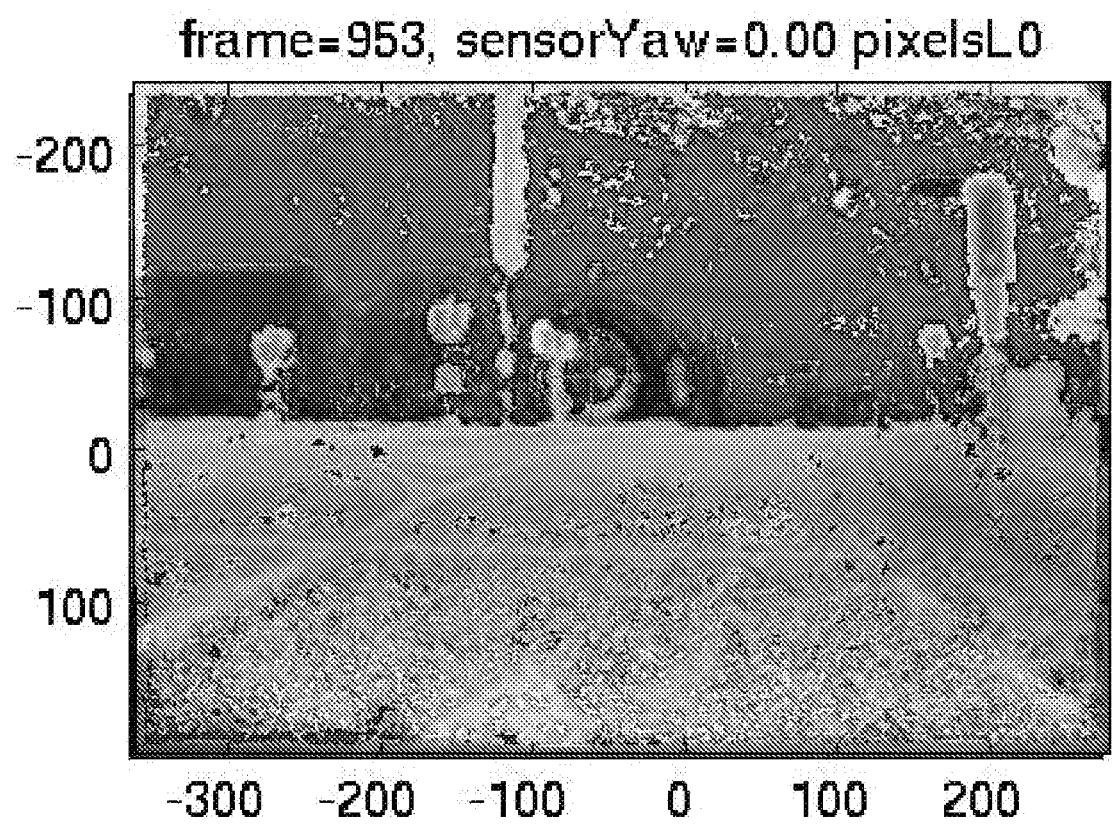
FIG. 4d shows an improved disparity map over the disparity map shown in FIG. 3d, according to a feature of the present invention.

FIG. 4d shows an improved disparity map over the disparity map shown in FIG. 3d, according to a feature of the present invention using multiple image pairs.

High Dynamic Range and Pre-Processing

Figure 5A:
FIGS. 5a, 5b and 5c show three images, according to a feature of the present invention.
Figure 5B:
Figure 5C:
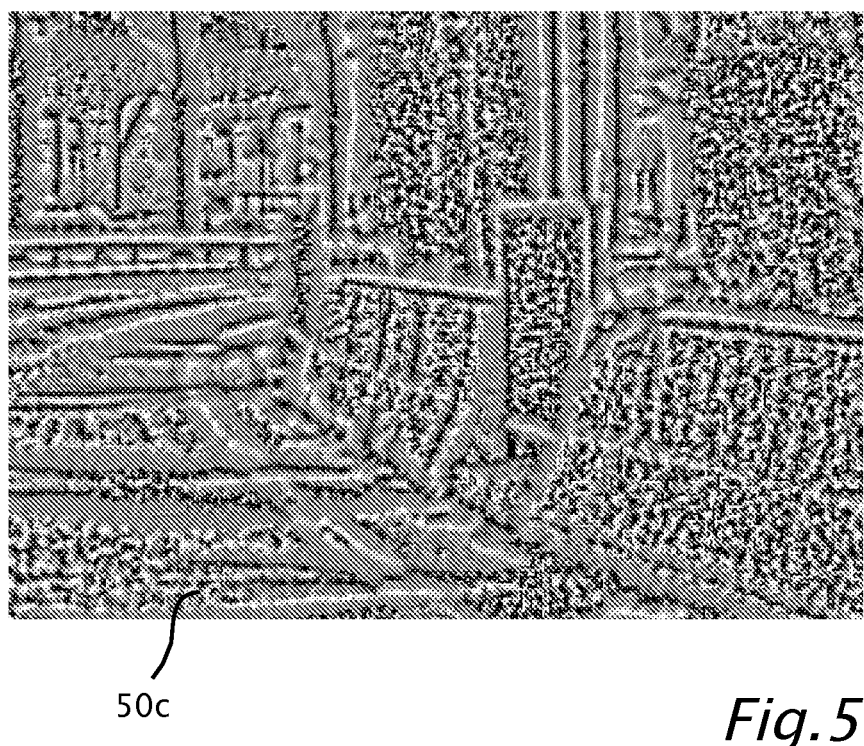

Reference is now made to FIGS. 5a, 5b and 5c which show images 50a, 50b and 50c, according to a feature of the present invention. Image 50a is an example of 12 bit high-definition resolution (HDR) image. Due to the large variation in lighting inside images of street signs, automotive camera systems use high dynamic range cameras. Accordingly, the Aptina AR0132 CMOS image sensor has a resolution of 1280×960 and high dynamic range where the 20 bit image is compounded into 12 bits. Even 12 bits may be computationally expensive to use, so local histogram equalization or adaptive histogram equalization may be performed. Adaptive histogram equalization is a computer image processing technique used to improve contrast in images. Adaptive histogram equalization computes several histograms, each corresponds to a distinct portion of the image, and uses histogram values to redistribute the grayscale/color values of the image. Adaptive histogram equalization may be used to reduce the image resolution, e.g. from 12 bits to 8 bits, while maintaining the local contrast of the image and maintaining the details in the image. Accordingly, image 50b shows image 50a after histogram equalization. In order to handle brightness changes inside the image due to artifacts such as lens vignetting, a rank transform may be performed on both images before computing the motion disparity. The rank transform replaces each pixel gray scale value with the count of how many pixels in the neighborhood have a lower pixel value. Useful neighborhood sizes are 5×5 and 7×7 which is shown in image 50c. Image 50c is rank transform image of detail of a barrier on the right hand side of images 50a and 50b.

Figure 6A:
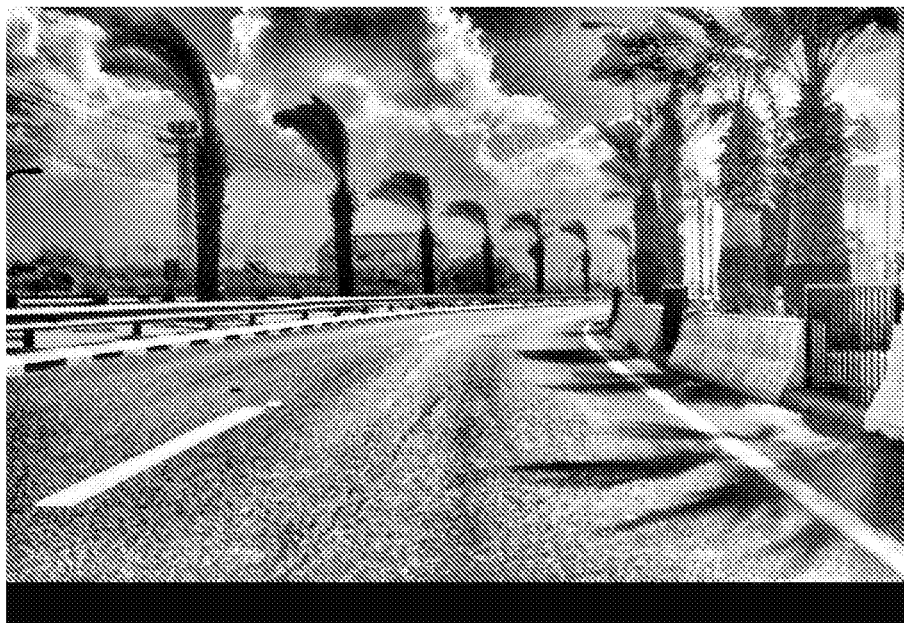
FIGS. 6a and 6b show an example of an image before and after warping respectively, according to a feature of the present invention.
Figure 6B:

Reference is now made to FIGS. 6a and 6b which shows an example of an image before and after warping respectively, according to a feature of the present invention. It can be seen that vertical surfaces in FIG. 6a, such as the fence on the right and the trees are distorted.

Figure 7:
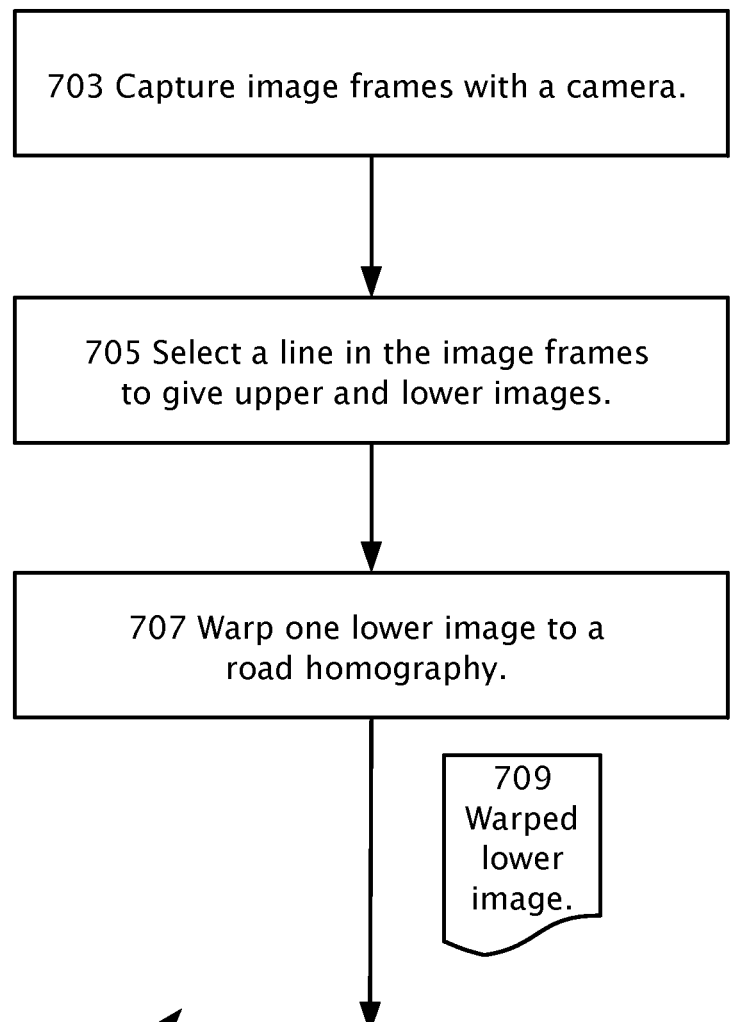
FIG. 7 shows a flowchart of a method, according to a feature of the present invention.

Reference is now made to FIG. 7 which shows a flowchart of a method 22, according to a feature of the present invention. Method 22 is used to determine three-dimensional structures in a road environment. In step 703 multiple image frames 15 are captured by camera 12 to be processed by processor 14 from driver assistance systems stored in system memory 23.

Patches on horizontal surfaces such as the road surface, undergo significant non-uniform scaling due to the host vehicle 18 motion which means that corresponding patches do not match well. The match can be improved significantly by first pre-warping the previous image towards the current image using a homography that corresponds to the predicted road motion.

The pre-warp may be performed only on points below a certain line in the image (step 705). This line typically depends on the horizon and is either fixed or can change dynamically with the road geometry and ego motion. For points above this line, matching occurs only between the two original images (possibly rectified to remove rotation). In step 707, for points below this line, that might be on the road surface, the matching may be performed twice: once between the original images and once between a warped previous image (warped using a road homography).

This pre-warp can be computed exactly if the road plane normal is known together with the camera 12 height and ego motion. Even if approximate values are used such as speed from the speedometer, yaw rate from inertial sensors and a default value for camera 12 height and plane normal, the previous image is brought much closer to the current image and the residual image scaling for points on the plane is greatly reduced.

For matches performed with the warped image, the disparity may be given by a disparity computed between a current image frame and a warped previous image frame combined with a disparity as computed from the road homography.

The disparity may be selected as the one that produces the best match score between the imaged features.

Alternatively, selecting between the models can be deferred. Once the road plane points have been determined from the disparity map (best computed from the road model warped image 709), disparity values using the pre-warped pair will be used for points on the road. Points which appear far from the road plane, disparity values are taken from the unwarped pair.

The concept of pre-warping can be extended further. A box like model can be created:
1. A road plane
2. A vertical plane perpendicular to the direction of travel at a distance Z,
    where Z might be a fixed value such as 40 m or depending on the host vehicle 18 motion. (e.g. 10 times the distance traveled)
3. Two vertical planes parallel to the direction of travel at a fixed distance to the left and right of camera 12. For example 5 m. The surfaces might also be curved according to the ego motion or lane marks.
4. No top surface.

Each point in the 'previous' image is warped according to a homography determined by which surface it is on and the ego motion. Then matching is performed to the current image patch.

The rank transform encodes spatial information about the patch. It is therefore advantageous to perform the rank transform after all warps are performed.

Moving Objects

Moving objects do not fulfill the rigid world assumption. Given a large moving object such as a truck, that fills the complete field of view it is not practical to perform structure from motion (SFM). However, the case of a truck that fills the complete field of view seldom occurs in practice. A more typical case is a lead vehicle moving through a rigid world where here are some images patches that are of moving objects. The image motion on these moving objects falls into two types. On objects moving parallel to the host vehicle 18 motion, such as vehicles in adjacent lanes and oncoming vehicle, the flow is along the epipolar lines however, the disparity will correspond to an incorrect distance. Objects moving in other directions will most often produce image flow that is not along the epipolar lines and will produce bad matches if flow along epipolar lines is assumed.

Figure 8:
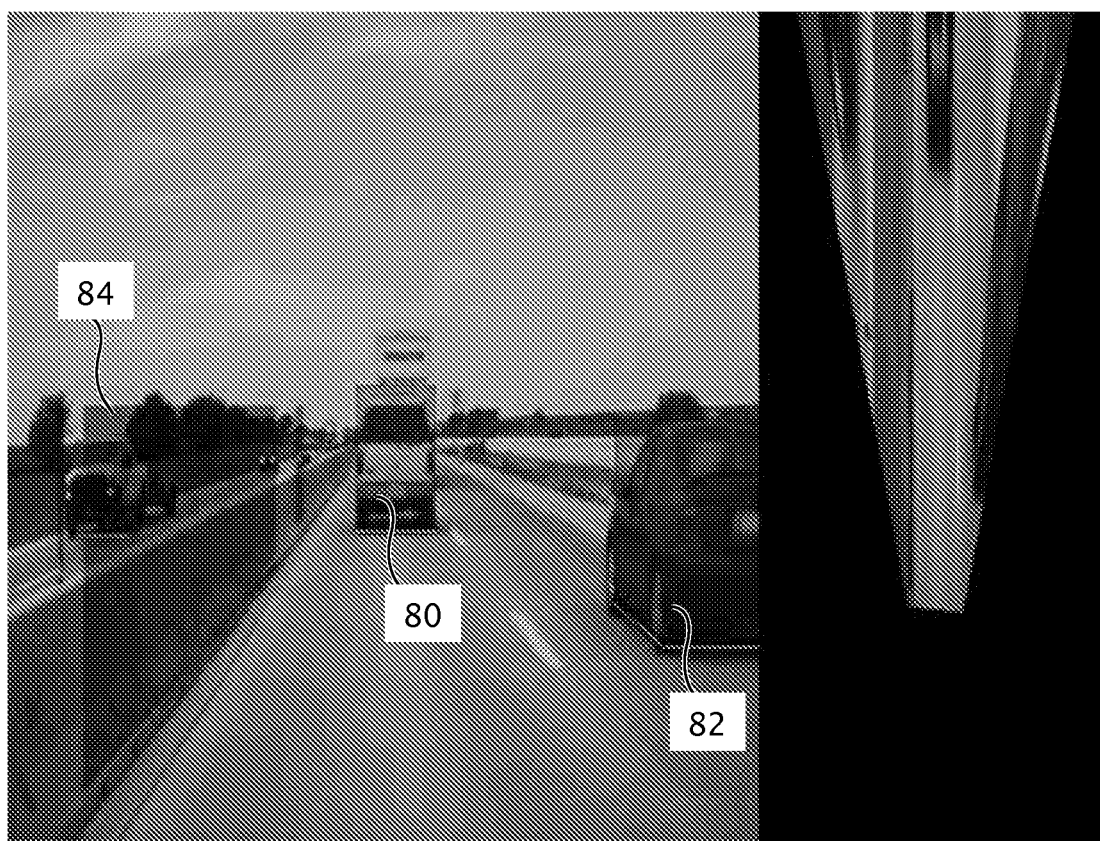
FIG. 8 shows an example road scene from a highway, according to a feature of the present invention.
Figure 9A:
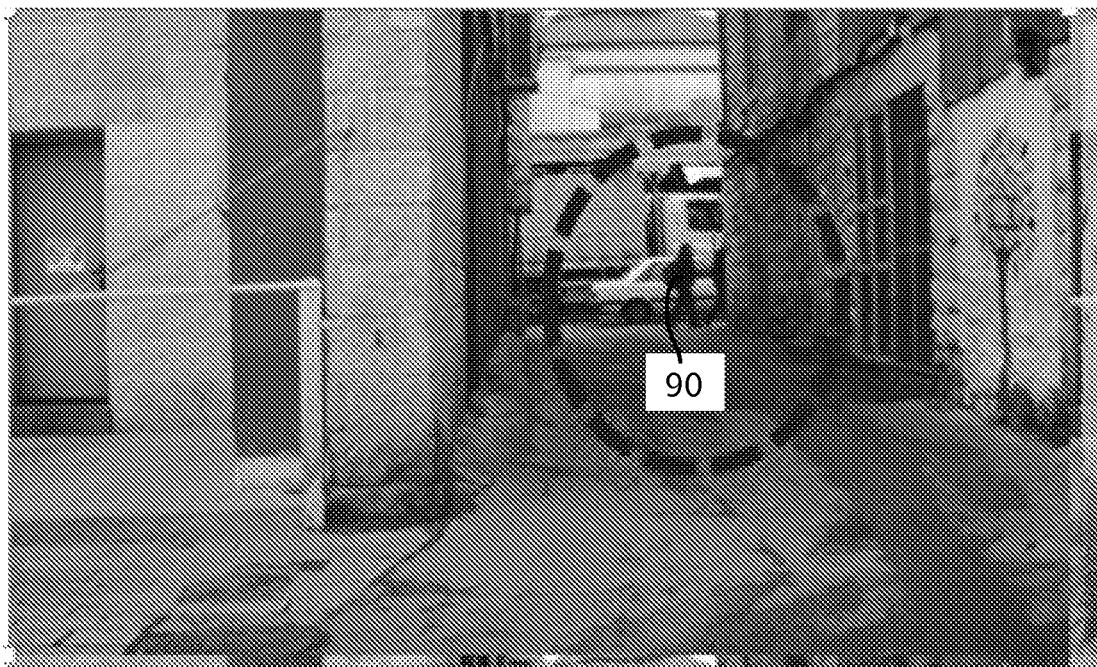
FIG. 9a shows horizontal, non-epipolar flow, detected on a pedestrian in an image which indicates a moving object, according to a feature of the present invention.
Figure 9B:
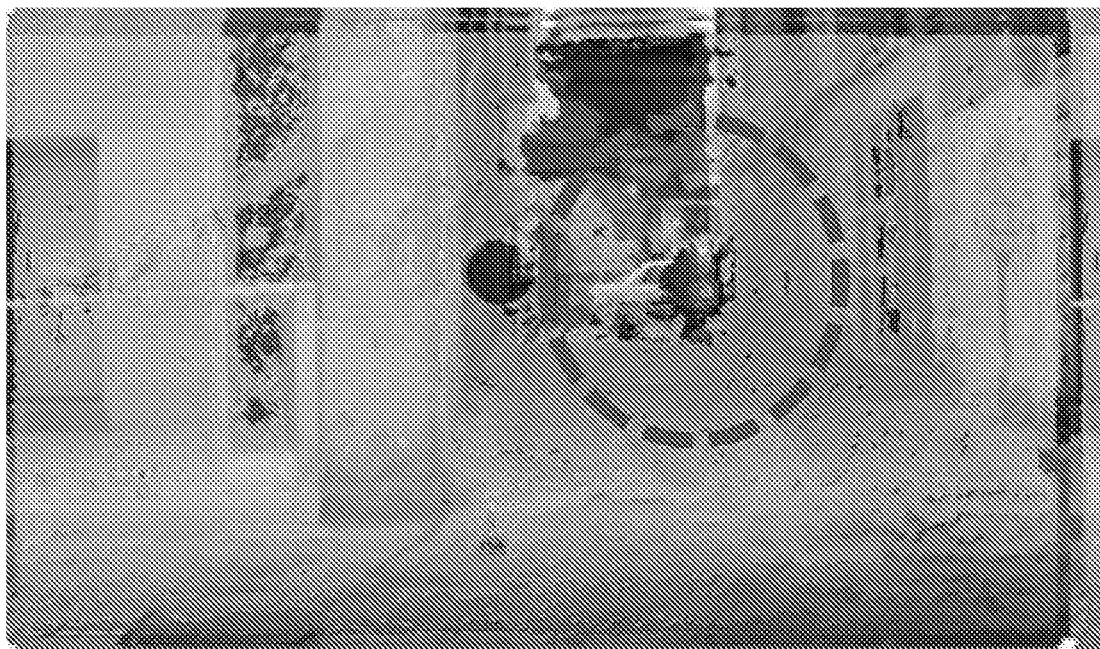
FIG. 9b, the flow pattern results in a depth value that indicates pedestrian for the image of FIG. 9a to be a very close object hanging in the air with no support down to the road, according to a feature of the present invention.
Figure 10A:
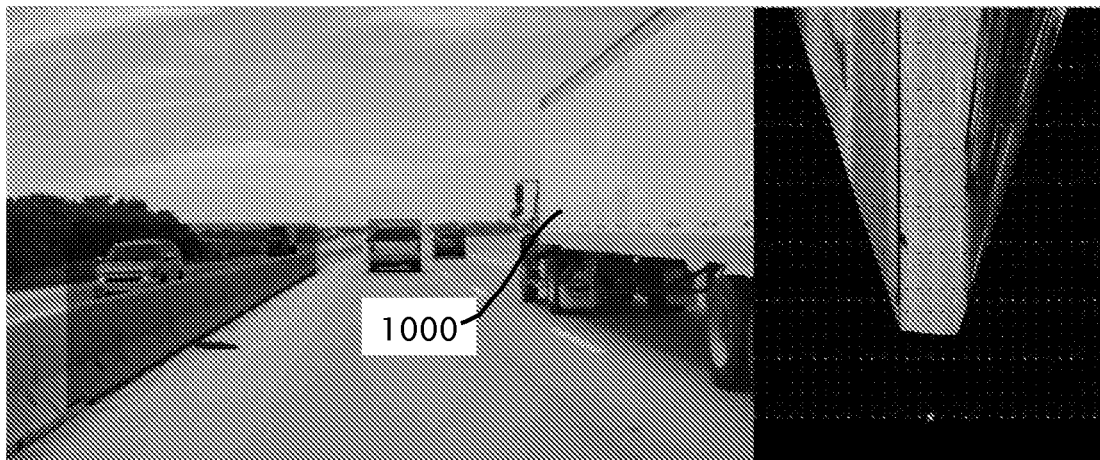
FIG. 10a shows a image captured when passing a truck, according to a feature of the present invention.
Figure 10B:
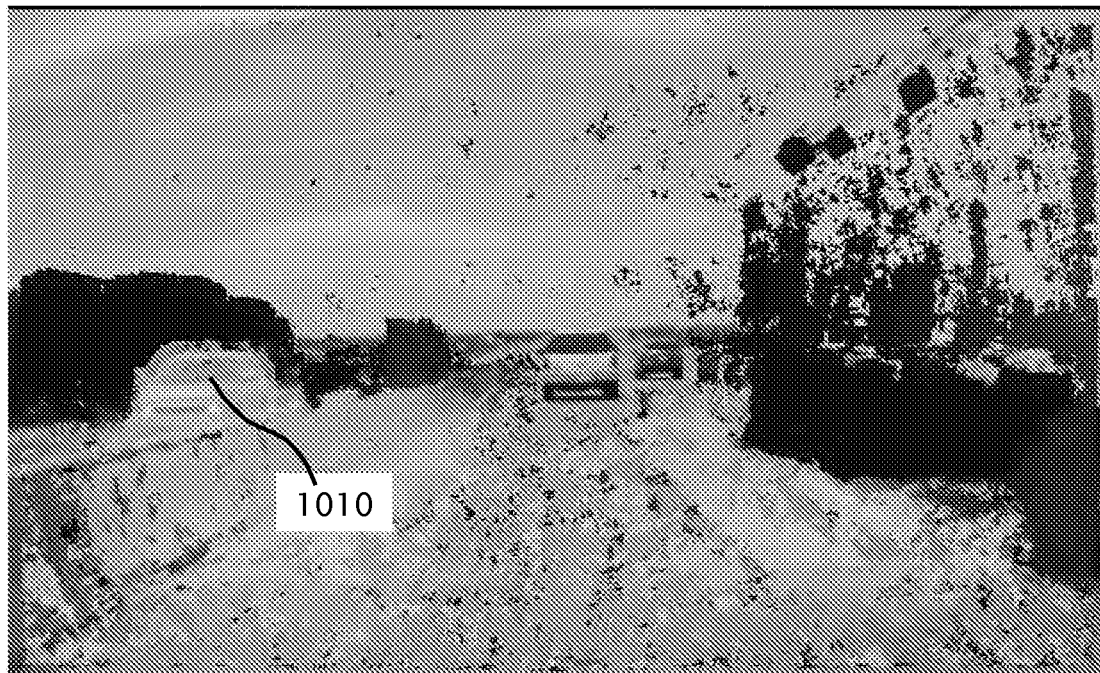
FIG. 10b shows the disparity map for FIG. 10a, according to a feature of the present invention.

Moving objects can be handled in a variety of ways:
1. Certain classes of objects can be detected and classified in the monocular image sequence based upon pattern recognition and other methods. FIG. 8 shows an example of a road scene from a highway, according to a feature of the present invention. Car 80 ahead was detected as a car by a vehicle detection system. The detected and classified objects, lead vehicle 80, vehicle 82 in adjacent lane and vehicle 84 in oncoming lane may be detected masked out.
2. Image flow is normally outward from the epipole which is a stationary point from current to earlier image frames. Inward flow patterns are clear indicators of a moving object. The vehicle 82 passing on the right may be detected using inward flow.
3. FIG. 9a shows horizontal, non-epipolar flow, detected on a pedestrian 90 which indicates a moving object, according to a feature of the present invention.
4. Certain flow patterns result in depth values that do not make sense. According to a feature of the present invention, in FIG. 9b, the flow pattern results in a depth value that indicates pedestrian 90 to be a very close object hanging in the air with no support down to the road.
5. FIG. 10a shows a image captured when passing a truck 1000, FIG. 10b shows the disparity map, according to a feature of the present invention. The large dark patch on truck 1000 in FIG. 10b translates to a depth that would put it under the road surface. Such large holes in the road are unlikely and are suspect as being from a moving object. Tracking of the 'hole' indicates that not only is it a hole in the road but that the hole is moving. This is clearly an artifact due to a moving object. The location of the patch on the road plane indicates the probably lateral displacement of the truck. This is then supplemented by detection of wheels.
6. Oncoming vehicles, such as the oncoming SUV 1010 in FIG. 10b result in larger image motion and thus appear closer than they are. In a typical example the oncoming vehicles may be traveling at the same speed but in opposite directions and as a result appear at half the true distance. This also means that oncoming vehicles appear laterally displaced at half the distance and might appear close to our lane. Objects close top our lane on the left (assuming right side drive) trigger an oncoming vehicle detection module that performs pattern recognition and headlight detection to reject oncoming vehicles.

The term "posts" as used herein refers to an imageable vertical texture in a structural barrier and may include any vertical structure or surface texture, e.g painted stripes, or the anti-glare slats. Hence, the terms "vertical texture" and "post" are used herein interchangeably.

The term "capture" as used herein refers to the real time recording and/or storage of image frames in a memory, for example volatile and/or non-volatile memory accessible by a processor.

The term "relative scale change" as used herein refers to the overall scale change in image coordinates dependent upon distance Z to a camera.

The indefinite articles "a" and "an" is used herein, such as "a warped image", "an image" have the meaning of "one or more" that is "one or more warped images" or "one or more images".

Summary of U.S. Application Ser. No. 13/237,163

Various methods are disclosed herein for detecting a structural barrier extending along a road. The methods are performable by a driver assistance system mountable in a host vehicle. The driver assistance system may include a camera operatively connected to a processor. Multiple image frames may be captured in the forward field of view of the camera. In the image frames, motion of images of the barrier are processed to detect the barrier. The camera may be a single camera. The motion of the images may be responsive to forward motion of the host vehicle and/or the motion of the images may be responsive to lateral motion of the host vehicle.

The structural barrier may include multiple posts. Multiple linear image structures are hypothesized in an image frame as projections of the barrier onto the road surface and multiple vertical image coordinates are obtained respectively from the linear image structures. The linear image structures may be image lines which run parallel to the image of the road and intersect the vanishing point of the image of the lane markers.

Multiple forward distances and corresponding lateral distances to the posts are computed based on the vertical image coordinates. Based on the known forward motion of the host vehicle and horizontal image coordinates of the linear image structures new horizontal image coordinates of the linear image structures are computed. The horizontal image coordinate in a second image frame of one of the images of the linear image structures is selected to align an image of one of the posts.

Alternatively, for each of the posts, forward distances from the host vehicle to the posts may be determined based on the motion of the images and the forward motion of the host vehicle. Lateral distances to the posts from the host vehicle may be determined from the forward distances and the horizontal image coordinates of the posts. Road plane lines at the lateral distances may be hypothesized to form multiple hypothesized road plane lines as projections of the vertical structural barrier onto the road surface. The hypothesized road plane lines at the lateral distances may be projected onto an image of the vertical structural barrier in an image frame. The correct road plane line is selected from the hypothesized road plane lines by aligning the correct road plane line with the image of the vertical structural barrier in the image frame.

Alternatively for a barrier without substantial vertical image texture, an image patch may be located in one of the image frames on an image line intersecting the vanishing point in the image frame. The image patch may be warped based on a vertical surface model. The vertical structural barrier may be detected by ascertaining that the patch is an image of the vertical structural barrier when points in columns of the patch scale vertically with host vehicle motion. Alternatively, the image patch may be warped based on a road surface model, and the patch may be an image of the road surface when points in rows of the patch scale horizontally with host vehicle motion. Various driver assistance systems may be provided for detecting a structural barrier extending along a road, The driver assistance system may be mountable in a host vehicle.

The camera may capture multiple image frames in the forward field of view of the camera. A processor may process motion of images of the barrier in the image frames. The camera may be a single camera. The camera may be configured to view in the direction of forward motion of the host vehicle. The motion of the images may be responsive to forward motion of the host vehicle and/or the motion of the images may be responsive to lateral motion of the host vehicle.

The motion of the images of the structural barrier may correlate with an image line in the direction of the vanishing point of the road, wherein the image line corresponds to a vertical projection of the structural barrier onto the road plane. The processor may be operable to hypothesize linear image structures as projections of the structural barrier onto the road plane to produce multiple hypotheses. Each of the hypotheses gives a lateral position of the barrier relative to the host vehicle. For each hypothesis, the lateral positions and host vehicle motion are used to predict image motion. The predicted image motion is compared to the actual image motion to verify the hypothesis and to derive the actual lateral position of the structural barrier relative to the host vehicle. Motion of the host vehicle may have a lateral component relative to the road direction and the image motion is of an image line in the image that is above the linear image structure.

The image line may be that of the top of the barrier. Vertical motion or looming of the image line may be used to determine lateral distance between the host vehicle and the structural barrier to determine whether the image line is of the same lateral distance as the linear image structure (the barrier) or on the road surface farther away. The processor may be operable to hypothesize multiple linear image structures in an image frame as projections of the barrier onto the road surface and obtain thereby multiple vertical image coordinates respectively from the linear image structures. The processor may be operable to compute multiple forward distances and corresponding lateral distances to the posts based on the vertical image coordinates. Based on the known forward motion of the host vehicle and horizontal image coordinates of the linear image structures, the processor may be operable to compute new horizontal image coordinates of the linear image structures to select the horizontal image coordinate in a second image frame of one of the images of the linear image structures and to align an image of one of the posts.

Alternatively, for each of the posts, the processor may be operable to determine forward distances from the host vehicle to the posts based on the motion of the images and the forward motion of the host vehicle. The processor may be operable to compute lateral distances to the posts from the host vehicle from the forward distance and horizontal image coordinates x of the posts. The processor may be operable to hypothesize road plane lines at the lateral distances, to form multiple hypothesized road plane lines as projections of the structural barrier onto the road surface; to project the hypothesized road plane lines at the lateral distances onto an image of the structural barrier in an image frame. The processor may be operable to select the correct road plane line from the hypothesized road plane lines by aligning the correct road plane line with the image of the structural barrier in the image frame. Alternatively for a barrier without substantial vertical image texture, the processor may be operable to locate in one of the image frames an image patch on an image line intersecting the vanishing point in an image frame, to warp said image patch based on a vertical surface model and to detect the structural barrier by ascertaining that the patch may be an image of the structural barrier when points in columns of the patch scale vertically with host vehicle motion. Or, the processor may be operable to ascertain that the patch may be an image of the road surface if or when points in rows of the patch scale horizontally with host vehicle motion.

Summary U.S. Application Ser. No. 13/693,713

Various driver assistance systems mountable in a host vehicle and computerized methods are provided for herein. The driver assistance system includes a camera operatively connectable to a processor. The driver assistance system is operable while the host vehicle is moving to detect a deviation in vertical contour of a road. A first image frame and a second image frame are captured in the field of view of the camera. Image motion is processed between respective images of the road derived from the first image frame and the second image frame. The vertical contour of the road is estimated using a road surface model of the road and the deviation in the vertical contour is computed from the road surface model. The optical flow may be estimated between multiple first image patches of the road derived from the first image frame and corresponding second image patches of the road derived from the second image frame. The deviation in the vertical contour is determined by comparing the optical flow with an optical flow as predicted by the road surface model. The residual optical flow indicates the deviation in vertical contour of the road.

A third image frame may be captured in the field of view of the camera and image motion between respective images of the road may be derived from the third image frame and one or more of the first and second image frames. A multi-frame road surface model may be computed by combining a road profile of the road derived from said road surface model based on said first image frame and said second image frame with said second processing.

The multi-frame road surface model may be mapped from the first and/or second image frames to the third image frame by using a homography between said at least one previous image frame to the third image frame.

Assuming a planar model for the contour of the road, the image motion of the images of the road may be processed by initially warping the second image frame toward the first image frame to produce a warped second image frame. The initial warp may include aligning the second image frame with the first image frame by adjusting for an image shift due to motion of the vehicle relative to the road, yaw, pitch and/or roll. The initial warp may include an adjustment for the relative scale change between the second image frame and the first image frame. The relative scale change arises from different distances to the camera.

Multiple image points may be selected in the first image frame. The image points may be located on the image of the road surface and may be located at points of a fixed grid. For the image points, multiple image patches are located disposed respectively about the image points. The image points may be tracked by correlating the image patches in the first image frame with corresponding image patches in the warped second image frame to produce multiple tracked points. The tracked points are fit to a homography. A refined warp of the warped second image frame toward the first image frame may be performed to correct the initial warp by using the homography and to produce a refinely warped second image frame. Optical flow may be computed between the refinely warped second image frame and the first image frame. The optical flow is compared with a road surface optical flow based on a road surface model. The deviation in vertical contour of the road produces a residual optical flow different from the road surface optical flow as found by the road surface model.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

We claim:

1. A method for determining a three-dimensional structure in an environment, the method performed by a system mountable in a host vehicle, wherein the system includes a camera operatively connectible to a processor, the method comprising:
capturing a plurality of image frames in a field of view of the camera, wherein the plurality of image frames includes a first image frame and a second image frame;
identifying a road of the environment in the first image frame;
in the first image frame, selecting a line, wherein the line separates a first portion of the first image frame determined to include the road of the environment and a second portion of the first image frame determined to exclude the road of the environment;
selecting a first point in the first portion of the first image frame;
matching the first point in the first portion of the first image frame with a second point in the second image frame to produce a first matching;
warping the first portion of the first image frame according to a road homography and ego-motion of the host vehicle to produce a warped portion of the image frame, wherein the ego-motion is based on at least one of speed, inertia, and steering angle of the host vehicle;
detecting in the warped portion of the first image frame a third point corresponding to the first point;
matching the third point in the warped portion of the first image frame with the second point in the second image frame to produce a second matching; and
selecting from among the first matching and the second matching to produce a selected matching.

2. The method of claim 1, further comprising:
providing a three-dimensional structure based on a selection of the image data in the second image frame.

3. The method of claim 2, wherein providing the three-dimensional structure based on the selection of the second point in the second image frame comprises:
computing image motion disparity between the first point and the second point in the second image frame; and
providing the three-dimensional structure from the image motion disparity.

4. The method of claim 1, further comprising:
providing a disparity map based on the warped portion of the first image frame and a portion of the second image frame;
from the disparity map, determining which image points are images of object points positioned on the road; and
selecting an image disparity for said images of object points from matching features of the warped portion of the first image frame.

5. The method of claim 1, wherein warping the first portion of the first image frame comprises:
pre-warping the first portion of the first image frame according to a homography corresponding to a vertical plane perpendicular to the direction of travel at a distance Z from the vehicle, wherein the distance Z is selectably either a fixed value or dependent on vehicle motion.

6. The method of claim 1, wherein warping the first portion of the first image frame comprises:
pre-warping the first portion of the first image frame according to respective homographies corresponding to two vertical planes parallel to the direction of travel at a fixed distance to the left and right of the camera.

7. The method of claim 1, wherein capturing a plurality of image frames in the field of view of the camera comprises:
capturing at least three image frames in the field of view of the camera of the road environment, the at least three image frames comprising:
a first image frame captured at a time A,
a second image frame captured at a time B, and
a third image captured frame at a time C,
wherein a time interval (C-A) is significantly greater than a time interval (B-A), wherein an epipole is a stationary point on image transformation between the at least three image frames;
for an image feature near the epipole, computing image motion between the third image frame captured at the time C and the first image frame captured at the time A;
for an image feature far from the epipole, computing image motion from the second image frame captured at the time B and the first image frame captured at the time A.

8. The method of claim 1, further comprising:
reducing image resolution of the image frames by performing a local histogram equalization around a matching feature within the image frames; and
providing the three-dimensional structure from motion of said matching feature within the image frames of reduced resolution.

9. The method of claim 8, further comprising:
performing a rank transform on the image frames, wherein the rank transform replaces a gray-scale of a picture element with a count of pixels in a local neighborhood of the picture element which a lower gray-scale value than the picture element.

10. A system for determining three-dimensional structure in a road environment, the system, mountable in a host vehicle, including a camera operatively connectible to a processor, the processor configured to:
capture a plurality of image frames in a field of view of the camera, wherein the plurality of image frames includes a first image frame and a second image frame;
identify a road of the environment in the first image frame;
in the first image frame, select a line, wherein the line separates a first portion of the first image frame determined to include the road of the environment and a second portion of the first image frame determined to exclude the road of the environment;
select a first point in the first portion of the first image frame;
match the first point in the first portion of the first image frame with data second point in the second image frame to produce a first matching;
warp the first portion of the first image frame according to a road homography and ego-motion of the host vehicle to produce a warped portion of the image frame, wherein the ego-motion is based on at least one of speed, inertia, and steering angle of the host vehicle;
detect in the warped portion of the first image frame a third point corresponding to the first point;
match the third point in the warped portion of the first image frame with the second point in the second image frame to produce a second matching; and
select from among the first matching and the second matching to produce a selected matching.

11. The system of claim 10, wherein the processor is further configured to:
provide a three-dimensional structure based on a selection of the second point in the second image frame.

12. The system of claim 11, wherein providing the three-dimensional structure based on the selected matching comprises:
computing image motion disparity between the first point and the second point in the second image frame; and
providing the three-dimensional structure from the image motion disparity.

13. The system of claim 10, wherein the road homography is estimated responsive to time varying values of speed and yaw rate of the host vehicle and default values of camera height and road plane normal.

14. The method of claim 1, further comprising:
estimating the road homography responsive to time varying values of speed and yaw rate of the host vehicle.

15. The method of claim 1, wherein matching the first point in the first portion of the first image frame with second point in the second image frame to produce a first matching comprises:
matching a plurality of points at substantially different distances in image space from an epipole.

16. The method of claim 1, wherein matching the first point in the warped portion of the first image frame with the second point in the second image frame to produce a second matching comprises:
finding a correspondence between a portion of the second image frame and the warped portion of the first image frame using a patch of N pixels by N pixels.

17. The system of claim 10, wherein matching the first point in the warped portion of the first image frame with the second point in the second image frame to produce a second matching comprises:
finding a correspondence between a portion of the second image frame and the warped portion of the first image frame using a patch of N pixels by N pixels.

18. A non-transitory computer-readable storage medium storing one or more programs, the one or more programs comprising instructions, which when executed by one or more processors of an electronic device, cause the electronic device to:
receive a previous image of a road environment and a current image of the road environment;
identify a road of the road environment in the previous image;
identify a first portion of the previous image including the road of the road environment and a second portion of the previous image excluding the road of the road environment;
warping the first portion of the previous image according to a homography of the road and ego-motion of a host vehicle to provide a warped portion of the previous image, wherein the ego-motion is based on at least one of speed, inertia, and steering angle of the host vehicle;
matching a first point between the first portion of the previous image and a second point of the current image to provide a first matching;
matching the first point between the warped portion of the previous image and the first portion of the current image to provide a second matching; and
providing a three-dimensional structure based on at least one of the first matching or the second matching.

* * * * *

UNITED STATES PATENT AND TRADEMARK OFFICE
CERTIFICATE OF CORRECTION

PATENT NO. : 10,685,424 B2
APPLICATION NO. : 15/957763
DATED : June 16, 2020
INVENTOR(S) : Livyatan et al.

Page 1 of 1

It is certified that error appears in the above-identified patent and that said Letters Patent is hereby corrected as shown below:

On the Title Page

In item (57), in "Abstract", in Column 2, Line 3, delete "connectable" and insert --connectible-- therefor Signed and Sealed this
Eighth Day of December, 2020

Andrei Iancu
*Director of the United States Patent and Trademark Office*